J. A. BOWDEN.
PRESSURE GAGE FOR PNEUMATIC TIRES.
APPLICATION FILED MAY 12, 1910.
1,279,078.
Patented Sept. 17, 1918.
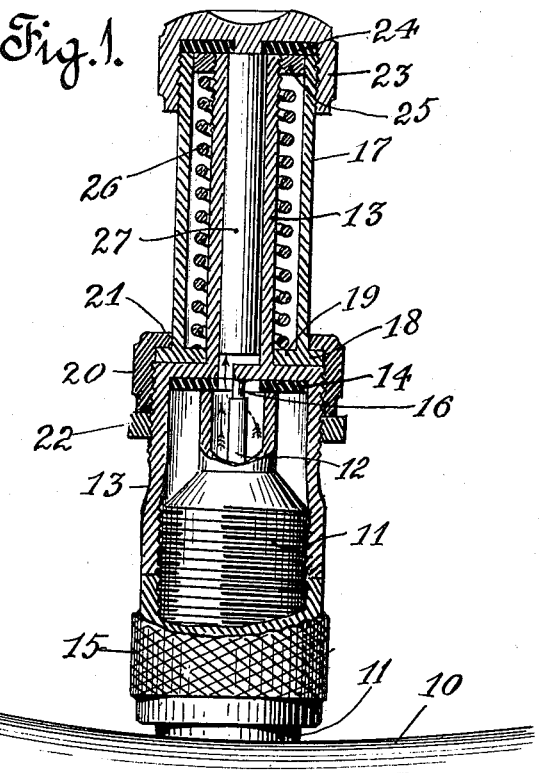
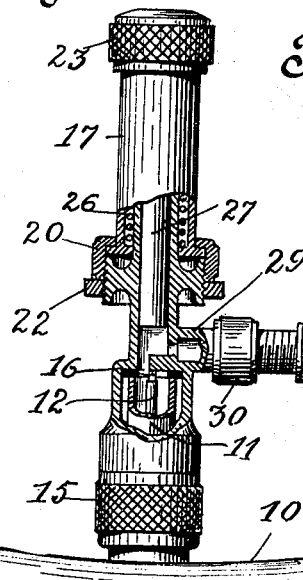
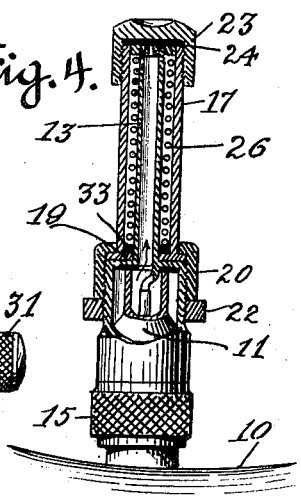
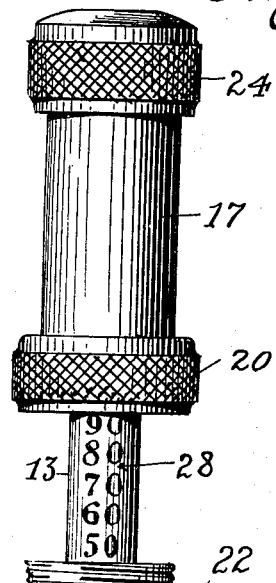
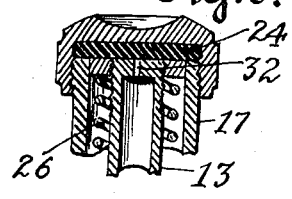
Witnesses,
Inventor,
Junius A. Bowden,
By his Attorney

UNITED STATES PATENT OFFICE.

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

PRESSURE-GAGE FOR PNEUMATIC TIRES.

1,279,078.      Specification of Letters Patent.      Patented Sept. 17, 1918.

Application filed May 12, 1910. Serial No. 560,796.

*To all whom it may concern:*

Be it known that I, JUNIUS A. BOWDEN, a citizen of the United States, residing in the city of Los Angeles, county of Los Angeles, State of California, have invented new and useful Improvements in Pressure-Gages for Pneumatic Tires, of which the following is a specification.

My invention relates to a pressure gage adapted to be placed upon and retained in position for use at any time upon the air inlet tube of a pneumatic tire; and the object thereof is to produce a simple and efficient device whereby the pressure in the tire can be quickly determined at any time, and a device in which the leakage of air when ascertaining the pressure shall be reduced to the minimum, and at all other times prevented. A further object is to provide a gage on which the indicator figures can be easily read.

I accomplish these objects by the pressure gage described herein and illustrated in the accompanying drawings in which, Fig. 1 is a longitudinal central section of my gage positioned upon the tire and in its inoperative position.

Fig. 2 is a side elevation of my improved device in its operative position indicating the pressure in the tire.

Fig. 3 is a side elevation partly in section showing a slight modification whereby the tire may be inflated without removing the gage.

Fig. 4 is a longitudinal central section of a modified form of the pressure gage.

Fig. 5 is an enlarged detail of the top portion of the parts shown in Fig. 4.

In the drawings 10 is a pneumatic tire which is provided with an air inlet tube 11 having the ordinary check valve 12 therein, all of ordinary construction. Upon the air inlet tube 11 is screwed a tubular casing 13, the upper end of which is reduced in size as best shown in Fig. 1. Within the lower portion of casing 13, and resting upon the top of the air inlet tube is a washer 14, preferably of rubber, which when the casing is screwed upon the tube, makes an air tight joint between the parts. Below casing 13 is a lock nut 15, which holds the casing locked upon the inlet tube, when the device is positioned for use. At the lower end of the reduced upper end of casing 13 is the check valve displacer 16 which normally holds check valve 12 of the tire unseated when the device is in place thereon, as shown in the drawings. Surrounding the reduced upper portion of casing 13 is a tubular casing 17 which is provided at the bottom thereof with an external annular flange 18 and an internal annular flange 19. The upper portion of the enlarged lower portion of casing 13 is externally threaded, and upon the same is screwed a nut 20 having an internal annular flange 21, which flange is adapted to rest upon the external annular flange 18 of casing 17, as shown in Fig. 1, and holds said casing 17 firmly secured upon casing 13. A lock nut 22 may be used to lock nut 20 upon casing 13. The upper end of casing 17 is externally threaded and upon the same is screwed a cap 23. A washer 24 preferably of rubber is interposed between the cap and the upper end of casing 17 to make an air tight joint. This washer also extends over the top of casing 13 when the device is in place on a tire and in its inoperative position as shown in Fig. 1, so as to prevent leakage of air between casings 13 and 17. The upper end of casing 13 is exteriorly threaded and upon the same is screwed an adjusting nut 25. This nut forms an exterior flange on the upper end of the casing and forms an upper bearing for the helical spring 26, the lower end of which rests upon flange 19 of casing 17. This nut fits between casings 13 and 17 and forms a guide for casing 17 as it moves upwardly, when the air pressure is being taken. Within casing 13 is a long plunger 27, the upper end of which bears against the inner side of cap 23, when air pressure is exerted against the inner end thereof. Upon the exterior surface of the reduced upper portion of casing 13 is placed a scale 28 (shown in Fig. 2) with graduations commencing at the inner end of the reduced upper end and so arranged that when nut 20 is unscrewed and the air pressure moves casing 17 outwardly against the pressure of spring 26 at whatever point on the scale the lower edge of nut 20 registers, the mark there shown indicates the pressure of air in the tire. As shown in Fig. 2, the pressure is indicated as being 90 pounds. This scale is graduated according to the pressure of the air operating against the tension of spring 26. When the device is new there will be more friction between the moving parts than after it has been used for some time. By screwing nut 25 to compress the spring a little more than it was compressed at first it compensates for this reduced frictional engagement, and retains the accuracy of the device. In Fig. 3 I have shown a charging inlet tube 29 which is provided with a check valve 30 and the outer end is screw threaded for the attachment of the hose of a charging pump not shown. The outer end of this charging tube is normally closed by a cap 31, which is removed when the tire is to be inflated. In Fig. 4 I have shown a slight modification of my device. In this modification I dispense with plunger 27 and reduce the outlet at the outer end of casing 13 to a small hole 32, through which air passes and forces the outer casing outwardly against the tension of spring 26. I also place upon the internal flange 19 of the outer casing an elastic packing or rubber washer 33, upon which spring 26 rests, thereby making a packed joint between casings 13 and 17 at this point. If desired this washer can be used in the construction shown in Fig. 1. I prefer the use of plunger 27 as it has a working fit in casing 13, and thereby reduces the loss of air when the air pressure is being taken. After the air pressure is taken, the operator presses on cap 24 and forces the outer casing back into its inoperative position as shown in Fig. 1, and then screws nut 20 to place and locks it with nut 22. When this is accomplished, there can be no loss of air as all the joints at which air can escape are packed by suitable washers. By removing the ordinary check valve in the air inlet tube, the displacer may be omitted.

Having described my invention what I claim is:—

1. A pressure gage for pneumatic tires, comprising a casing adapted to be attached to a valve and having an opening at its outer end, a pressure-responsive element therein, means for fastening said pressure-responsive element against movement, and means adapted to close the end of said casing against the passage of air, said fastening means, when operated to fasten said pressure-responsive element against movement, being adapted to move and hold said closing means in closing position.

2. A gage for pneumatic tires, comprising a casing adapted to be attached to a valve and having an opening at its outer end, a pressure-responsive element therein, means adapted to fasten said pressure-responsive element against movement, said pressure-responsive element having means thereon for closing air-tight the end of the casing when held in fastened position.

3. A gage for pneumatic tires, comprising a casing adapted to be attached to a valve, a spring-resisted plunger in said casing, said casing constituting a cylinder for said plunger, and a sleeve exterior of said casing actuated by said plunger, the sleeve and casing being one provided with a graduated scale and the other acting as a pointer moving along said scale.

4. A gage for pneumatic tires, comprising a casing adapted to be attached to a valve, a plunger in said casing, said casing constituting a cylinder for said plunger, and a sleeve slidable upon the exterior of said casing and adapted to be actuated by said plunger, degrees of pressure being represented by the relative positions of said casing and sleeve, and a spring between said casing and sleeve for resisting pressure-responsive movement of said plunger.

5. A gage for pneumatic tires, comprising a casing adapted to be attached to a valve, a spring-resisted plunger in said casing, and a sleeve exterior of said casing and adapted to be actuated by said plunger, degrees of pressure being represented by the relative positions of said casing and sleeve, and means on said sleeve for fastening said plunger against movement.

6. A gage for pneumatic tires, comprising a casing adapted to be attached to a valve, a plunger in said casing, and a sleeve exterior of said casing and adapted to be actuated by said plunger, said casing having a shoulder at its outer end, and said sleeve having a shoulder at its inner end, and a spring between said sleeve and casing, bearing at its ends upon said shoulders.

7. A gage for pneumatic tires, comprising a casing adapted to be attached to a valve, said casing having a contracted portion, a pressure-responsive member in the contracted portion of said casing, a sleeve exterior of said casing adapted to be operated by said pressure-responsive member, and means adapted to engage said sleeve and the larger portion of said casing for fastening said pressure-responsive member against movement.

8. A gage for pneumatic tires, comprising a casing adapted to be attached to a valve, said casing having a contracted portion, a pressure-responsive member in the contracted portion of said casing, a sleeve exterior of said casing adapted to be operated by said pressure-responsive member, and means adapted to engage said sleeve and the larger portion of said casing for fastening said pressure-responsive member against movement, and a packing adapted to be pressed against said casing when said sleeve and casing are connected together.

In witness that I claim the foregoing I have hereunto subscribed my name this 5th day of May, 1910.

JUNIUS A. BOWDEN.

Witnesses:
G. E. HARPHAM,
D. B. AUSTIN.